L. A. CASWELL.
WHEEL.
APPLICATION FILED SEPT. 18, 1908.
947,215.
Patented Jan. 18, 1910.
2 SHEETS—SHEET 1.
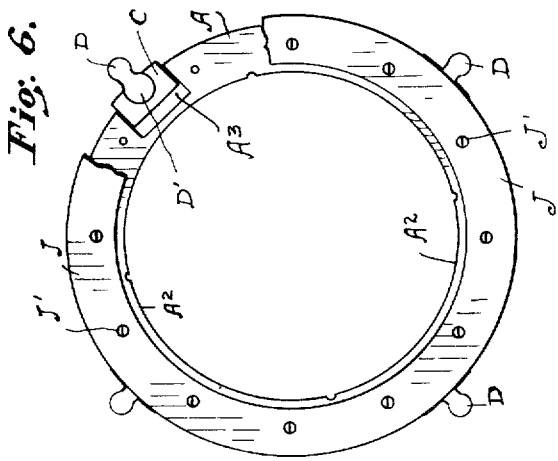
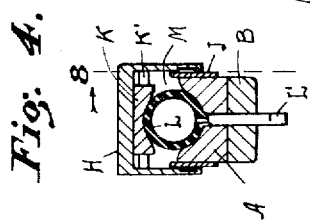
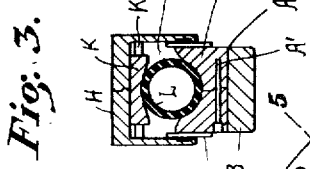
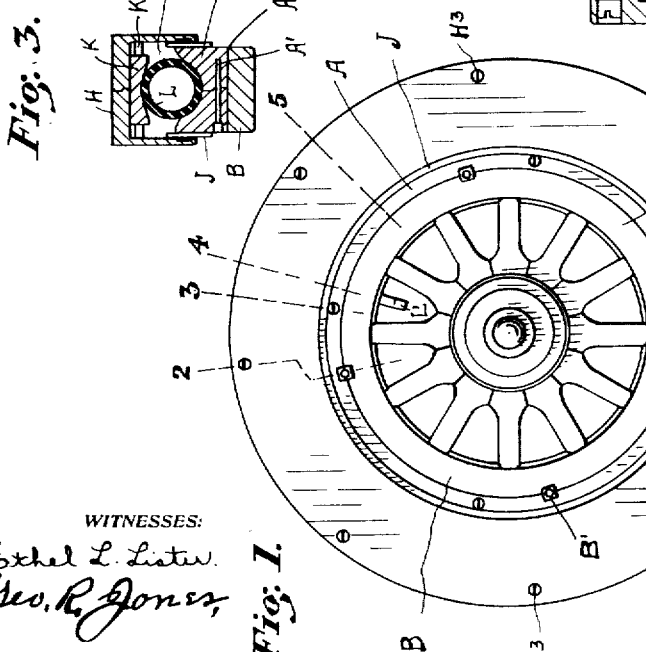
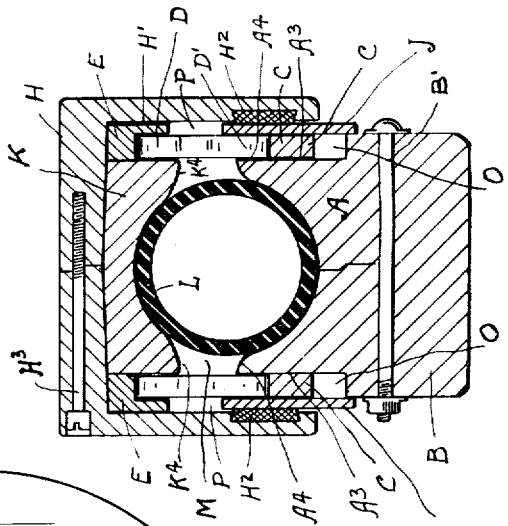
WITNESSES:
Ethel L. Lister.
Geo. R. Jones.
INVENTOR
LUTHER A. CASWELL,
BY Thomas L. Ryan
ATTORNEY L. A. CASWELL.
WHEEL.
APPLICATION FILED SEPT. 18, 1908.
947,215.
Patented Jan. 18, 1910.
2 SHEETS—SHEET 2.
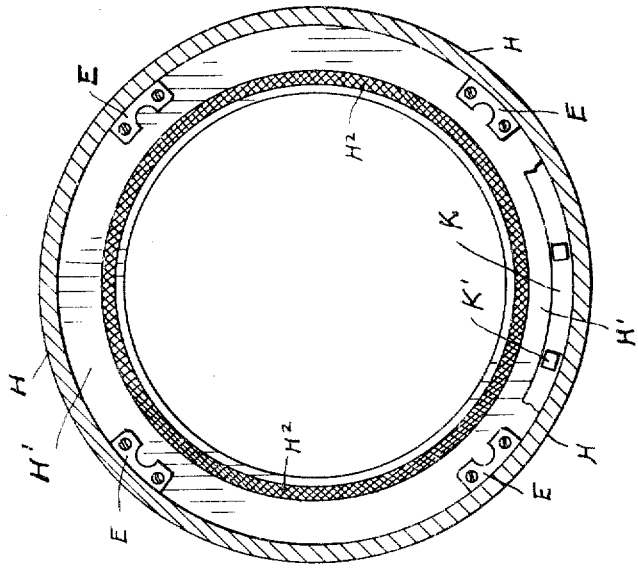
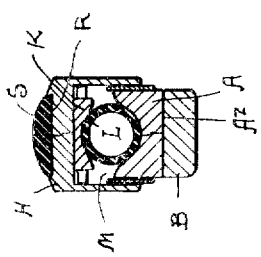
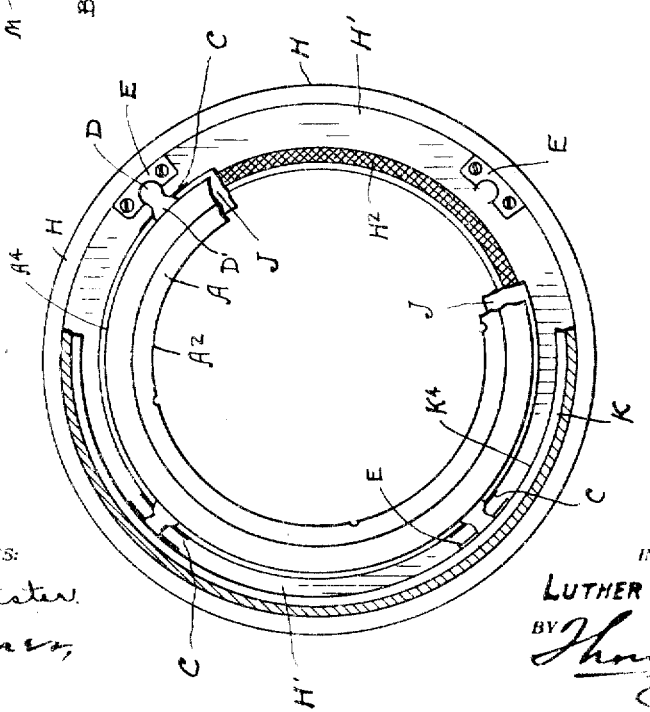
WITNESSES:
Ethel L. Lister
Geo. R. Jones
INVENTOR
LUTHER A. CASWELL.
BY Thomas L. Ryan
ATTORNEY

UNITED STATES PATENT OFFICE.

LUTHER A. CASWELL, OF MUNCIE, INDIANA, ASSIGNOR OF ONE-HALF TO GOLA DANNER, OF MUNCIE, INDIANA.

WHEEL.

947,215.  Specification of Letters Patent.  Patented Jan. 18, 1910.

Application filed September 18, 1908. Serial No. 453,674.

*To all whom it may concern:*

Be it known that I, LUTHER A. CASWELL, a citizen of the United States, and residing in the city of Muncie, in the county of Delaware and State of Indiana, have invented a new and useful Wheel, of which invention I declare the following to be a specification.

The objects of this invention are to provide a wheel which will have the cushion-like or resilient medium of transmission between the periphery of the wheel and the felly such as is afforded by the well known pneumatic tube tire, and at the same time to provide a tire which will be not subject to puncture, and which will be durable.

My invention consists in the novel construction, combination, and arrangement of parts described in this specification, definitely pointed out in the appended claims, and clearly illustrated in the accompanying drawings.

Similar characters of reference refer to corresponding parts throughout the several views, in which—

Figure 1 is a side view of my improved wheel. Fig. 2 is an enlarged transverse sectional view taken on the line 2 Fig. 1, the rocker bars being shown in elevation. Fig. 3, Fig. 4 and Fig. 5, are transverse sectional views taken on the lines marked 3, 4 and 5, Fig. 1. Fig. 6 is a side view of the seat rim removed, a part of the face ring J being broken away. Fig. 7 is a central longitudinal sectional view, a part of the center ring and a part of the seat rim being broken away. Fig. 8 is a longitudinal sectional view on the line 8—8 Fig. 4 the seat rim and all but a broken off portion of the center ring having been removed. Fig. 9 is a view of a modified form of my invention.

The metallic annular seat-rim A centrally divided and having its two members connected together by the bolts $A^1$ is suitably machined on its internal face $A^2$ to fit the felly B of the wheel. The internal finish of the seat rim may be varied to suit the different forms of faces presented by fellies of various makes. As a practical means for fastening this seat rim to the felly the transverse bolts $B^1$ sunk in suitable transverse semicircular registering grooves provided in the meeting faces of the felly and the seat rim, are shown. The lateral faces of this seat-rim are provided with the radial recesses $A^3$ of form and dimensions to retain loosely the slide-blocks C. It has been found that four of these slide-blocks arranged as shown, on each side of the seat rim give good results, but it will be understood that any number of them may be used if desired. Correctly retained in each of these slide-blocks is the circular head $D^1$ of the rocker bar, the head D is retained in similar manner in the head block E that is rigidly secured to the internal face of the wall $H^1$ of the outer rim H.

By inspection of the views Fig. 6 and Fig. 7, the structure of these rocker bars, slide-blocks and head blocks will be easily understood. The circular recesses in these blocks are so positioned that while the rocker bars are free to oscillate therein the recess walls are of sufficient extent, that the head of the rocker will be safely retained in the recess.

The flat metallic face rings J are held in place on the lateral faces of the seat rim A by the countersunk bolts $J^1$ a smooth exterior being presented. These face rings are made of metal of suitable hardness to stand wear, and their function in addition to forming a lateral retention wall for the slide-blocks C, is to afford a smooth bearing surface for the packing ring $H^2$ seated in the walls $H^1$ of the outer rim H as shown in Fig. 2 and Fig. 7. The recess for this packing ring, which is made of felting, leather or any other suitable material has its walls of suitable flared formation so that the packing ring will be securely retained therein. The function of these packing rings is to prevent rattle and to make a close jointure between the walls of the outer rim and the rings J.

As plainly shown in Fig. 2 the outer rim H is centrally divided and has its two members connected together by the bolts $H^3$. Within this outer rim is disposed the center-ring K, adapted to fit snugly therein. The under face of this center ring is of proper transverse curvature to afford a suitable bearing for the pneumatic tube L which will be presently referred to. The peripheral face of the center ring is slightly beveled transversely in each direction from the center, to fit the correspondingly beveled internal face of the outer rim H. By this construction there will be no tendency of the parts to unduly stick together or bind when my improved wheel is being taken apart.

The transverse thickness or width of this center ring is such that the internal faces of the rocker bars will rest against its lateral surfaces whereby a practical guideway for these rocker bars is formed by these side surfaces and by the head blocks E hereinbefore described. By means of the studs K¹ which are of proper length to bear against the internal faces of the walls H¹ of the outer rim and which are spaced at intervals between the rocker bars, the center ring is sustained in correct central position.

By the combination and arrangement of parts just described the annular chamber M is formed. Positioned in this chamber is a pneumatic tube L which has the usual valve stem L¹ that extends through the seat-rim and the felly as shown in Fig. 1 and Fig. 4.

By the structure shown the two separable half sections are provided with the rabbeted central lines of jointure, and are adapted to be drawn and secured rigidly together by the bolts A¹ and H³, the tube L and the center ring K being in the proper position as shown in Fig. 2. The rounded edge A⁴ and K⁴, of the seat rim and the center ring respectively are to provide a perfectly smooth seat for the resilient tube whereby cutting, mutilation, or other wear is prevented. When the tube is in inflated condition the positions of the parts of my improved rim are as shown in Fig. 2 there being the clearance spaces O and P which will presently be referred to.

By the construction, combination and arrangement of parts shown, a tire is provided which will have the property of resiliency so very desirable for all forms of vehicle wheels, and which at the same time will be strong and durable, easily manipulated and not liable to get out of repair.

This improved wheel complete and in readiness for use appears, in cross section, as illustrated in Fig. 2. When the tube is fully inflated the outer ring occupies the normal position as shown, concentric to the seat-rim. I have provided a registration line on the face ring with which line the internal edge of the wall of the outer rim will register when the tube is fully inflated.

The mode of operation of my improved wheel will be easily understood. With the loading of the wheel and the compression of the tube there will be a movement of all of the rocker bars, and the usual resilient action of the pneumatic tube will not have been interfered with; in action, the center ring and the outer rim moving along with the wheel in the capacity of a shield for the resilient tire.

It will be understood that I do not limit myself to the precise construction, arrangement and detailing of parts as shown, as it is obvious that minor changes might be made therein within the scope of the invention as claimed and without departing from or sacrificing any of the principles thereof.

My invention is of especial utility for wheels of vehicles intended for heavy loading and the rough usage, wear and tear, incident to heavy traffic over hard and uneven pavements. Where it is desired that my invention be applied to wheels intended to operate without noise, the modification shown in Fig. 9 may be used. In this modified form, the outer rim is provided with the suitable dove-tail seat R in which is secured the rubber tire S.

By reason of the tube being at all times incased and thoroughly protected from the elements, and saved from all abnormal strains it will last indefinitely and the utility of the wheel fitted therewith is greatly enhanced.

What I claim as my invention and desire to secure by Letters Patent, is—

1. A wheel tire comprising a seat rim having a plurality of radial recesses on its sides, blocks slidingly disposed in the said recesses, a rocker bar at and having its head loosely retained in each of said blocks, a face ring secured on each side of said seat rim to retain the said blocks in the said radial recesses, an outer rim having oppositely disposed walls, head blocks carried by the outer rim to retain loosely the outer head of said rocker bars, a center ring disposed within and having its peripheral face bearing against the internal face of the said outer rim, and a flexible pneumatic tube between the said seat rim and the center ring.

2. A wheel tire comprising a seat rim having a plurality of radial recesses on its sides, blocks slidingly disposed in the said recesses, a rocker bar at and having its head loosely retained in each of said blocks, a face ring secured on each side of said seat rim to retain the said blocks in the said radial recesses, an outer rim having oppositely disposed walls the internal faces of which are provided with continuous annular channels, head blocks carried by the outer rim adapted to retain loosely the outer heads of said rocker-bars, a ring of packing to fill the annular channels of the walls of said outer rim and to engage the face rings, a center ring disposed within and having its peripheral face bearing against the internal face of the outer rim, the sides of the said center ring having transversely disposed studs to engage the inner surfaces of the side walls of the outer rim, and a flexible pneumatic tube between the seat rim and the center ring.

3. In a wheel the combination with a felly rim having transverse grooves therein, of a seat rim having transverse grooves in its internal face to register with the first named grooves and there being radial recesses formed on the sides of said seat rim, bolts to occupy the bores formed by said meeting grooves, blocks slidingly disposed in the said recesses, a rocker bar at and having its head loosely retained in each of said blocks, a face ring secured on each side of said seat ring to retain the said blocks in the said radial recesses, an outer rim having oppositely disposed walls, head blocks carried by the outer rim to retain loosely the outer head of said rocker bars, a center ring disposed within and having its peripheral face bearing against the internal face of the said outer rim, and a flexible pneumatic tube between the said seat rim and the center ring.

In testimony whereof I sign my name to this specification in the presence of two subscribing witnesses.

LUTHER A. CASWELL.

Witnesses:
GOLA DANNER,
THOMAS L. RYAN.